J. C. PFIEL.
GANG PLOW.
No. 66,039. Patented June 25, 1867.
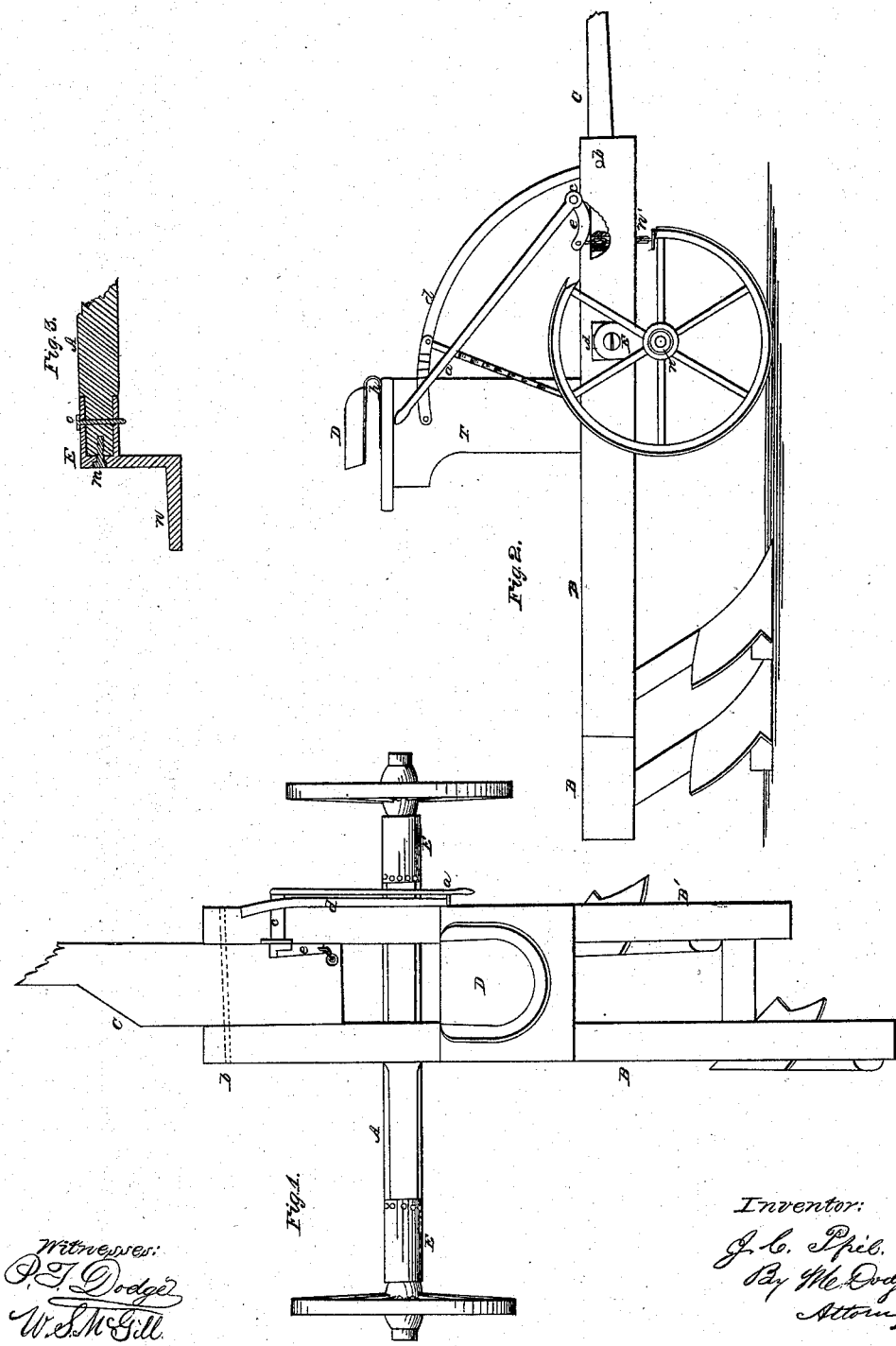

United States Patent Office.

JOHN C. PFEIL, OF ARENZVILLE, ILLINOIS.

Letters Patent No. 66,089, dated June 25, 1867.

---

IMPROVEMENT IN GANG-PLOUGHS.

---

The Schedule referred to in these Letters Patent and making part of the same.

---

TO ALL WHOM IT MAY CONCERN:

Be it known that I, JOHN C. PFEIL, of Arenzville, in the county of Cass, and State of Illinois, have invented certain new and useful improvements in Gang-Ploughs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a top plan view.

Figure 2, a side elevation; and

Figure 3 is a view of a portion detached, and shown in section.

My invention consists in a novel arrangement of the parts for adjusting the ploughs, and in a novel method of constructing and attaching the bent axles.

A represents an axle having a wheel at each end, as is usual in this class of ploughs. The plough-beams B and B' are secured together, and have their front ends resting upon and projecting forward of the axle A, as shown. Between these beams at their front end a tongue, C, is pivoted by a bolt, $b$, and directly in rear of this bolt a shaft, $c$, is secured to the beam B', as shown in fig. 1. The inner end of this shaft $c$ projects over the tongue C, and has attached to it a curved or cam-shaped bar, $e$, the under face of which rests upon the upper side of the tongue near its rear end. A lever or handle, $a$, is secured to the outer end of the shaft $c$ and extends backward and upward to bring it within reach of the driver mounted on the seat D. To the rear end of the curved bar or segment $e$ a chain, $n'$, is attached, and passes down through a hole in the rear portion of the tongue, as shown in the drawings, a T-piece being attached to the lower end of the chain, as shown in fig. 2, to prevent the chain from being drawn out of the hole when the lever $a$ is thrown forward. It will thus be seen that by pressing the lever $a$ backward, the cam $e$ presses upon the rear end of the tongue, thereby tending to elevate the rear ends of the beams and the ploughs attached thereto, by which means the depth of the ploughs in the ground may be regulated or varied at will. When it is desired to throw the ploughs clear of the ground, as in travelling to and from the field, the lever $a$ is pressed still farther back and caught in one of the notches on the rack $d$ where it is held until released. By pressing the lever $a$ forward until the chain pulls up on the rear end of the tongue, the ploughs are held in the ground, while by leaving the lever loose, the tongue is left loose to play up and down like an ordinary wagon-tongue. In order to vary height of the axle A, so as to cause the ploughs to run more or less deeply, and also to so adjust the wheels as to permit one to run in the furrow, while the other runs upon the unploughed ground, and still keep the axle A horizontal, so as to cause the two ploughs to run level and of equal depth, I attach the wheels to the axle A by means of the bent axles E. This axle is made of cast iron, its larger portion being cast in the form of a cap to fit over the end of the wooden axle A, as shown in section in fig. 3. It is secured to A by a screw-bolt, $m$, which passes through a hole made centrally in the end of the cap portion, as shown, and has the axle $n$ for the wheel attached to an arm standing at right angles to the axle proper. A series of holes is made through the cap portion, as shown in fig. 1, and a single hole corresponding with these is also bored through the axle A, through which a bolt, $o$, passes, as shown in fig. 3. By this means the bent axles are easily and cheaply fitted to the main axle A, and are readily adjusted thereon, as desired, the cap portion serving to protect the ends of the wooden axle and preventing it from splitting.

Having thus described by improvement, what I claim, is—

1. The lever $a$ having the cam $e$ attached and arranged to operate, in combination with the tongue C and beams B and B', as shown and described.

2. Constructing the crank-axles E with a tubular portion to fit on the end of the wooden axle A, as shown and described.

JOHN C. PFEIL.

Witnesses:
C. F. DIFFENBACHER,
J. L. CIRÉ.